United States Patent [19]

Meece et al.

[11] 4,190,402
[45] Feb. 26, 1980

[54] INTEGRATED HIGH CAPACITY COMPRESSOR

[75] Inventors: Meredith W. Meece, Monroe; Charles W. Ickes, Farmerville; Fred H. Moore, Monroe, all of La.

[73] Assignee: International Telephone and Telegraph Corporation, New York, N.Y.

[21] Appl. No.: 575,112

[22] Filed: May 6, 1975

[51] Int. Cl.² .................. F04B 35/04; F04B 27/02
[52] U.S. Cl. ................................ 417/415; 92/155
[58] Field of Search ............ 417/415, 571, 368, 534; 92/155

[56] References Cited

U.S. PATENT DOCUMENTS

| 1,187,031 | 6/1916 | Black et al. | 417/415 |
|---|---|---|---|
| 1,472,110 | 10/1923 | Woelfel | 417/415 |
| 2,065,162 | 12/1936 | Trask | 417/419 |
| 2,246,868 | 6/1941 | Trask | 417/419 |
| 2,751,146 | 6/1958 | Moseley | 417/415 |
| 3,125,004 | 3/1964 | White | 92/155 |
| 3,145,914 | 8/1964 | Nicholas | 417/415 |
| 3,154,705 | 10/1964 | Essenburg | 310/74 |
| 3,315,881 | 4/1967 | Halpin et al. | 92/155 |
| 3,375,972 | 4/1968 | Raufelsen | 417/571 |
| 3,410,477 | 11/1968 | Hartley | 417/571 |
| 3,478,956 | 11/1969 | Gosha | 417/571 |
| 3,563,677 | 2/1971 | Rutan | 417/415 |
| 3,679,333 | 7/1972 | Zoppi | 417/571 |
| 3,839,946 | 10/1974 | Paget | 92/170 |

FOREIGN PATENT DOCUMENTS

| 1503434 | 10/1969 | Fed. Rep. of Germany | 417/368 |
|---|---|---|---|
| 1017693 | 9/1952 | France | 310/74 |

*Primary Examiner*—William L. Freeh
*Attorney, Agent, or Firm*—John T. O'Halloran; Peter C. Van Der Sluys

[57] ABSTRACT

A compressor motor has a flywheel connected directly to a motor shaft which drives two opposed pistons that are simultaneously compressed so that the bearing loads are balanced. A double inlet blower is connected to said shaft and has one inlet for drawing cooling air through a crankcase for cooling the connecting rod bearings. A second inlet draws air through a vent formed in a shroud member. The blower discharges the air from both inlets into the shroud member which then directs the air to the cylinder sleeves and heads for cooling purposes. The cylinder, piston skirts and piston rings are self-lubricated by containing a fluorocarbon thereby substantially reducing the heat generating friction between said members.

6 Claims, 5 Drawing Figures

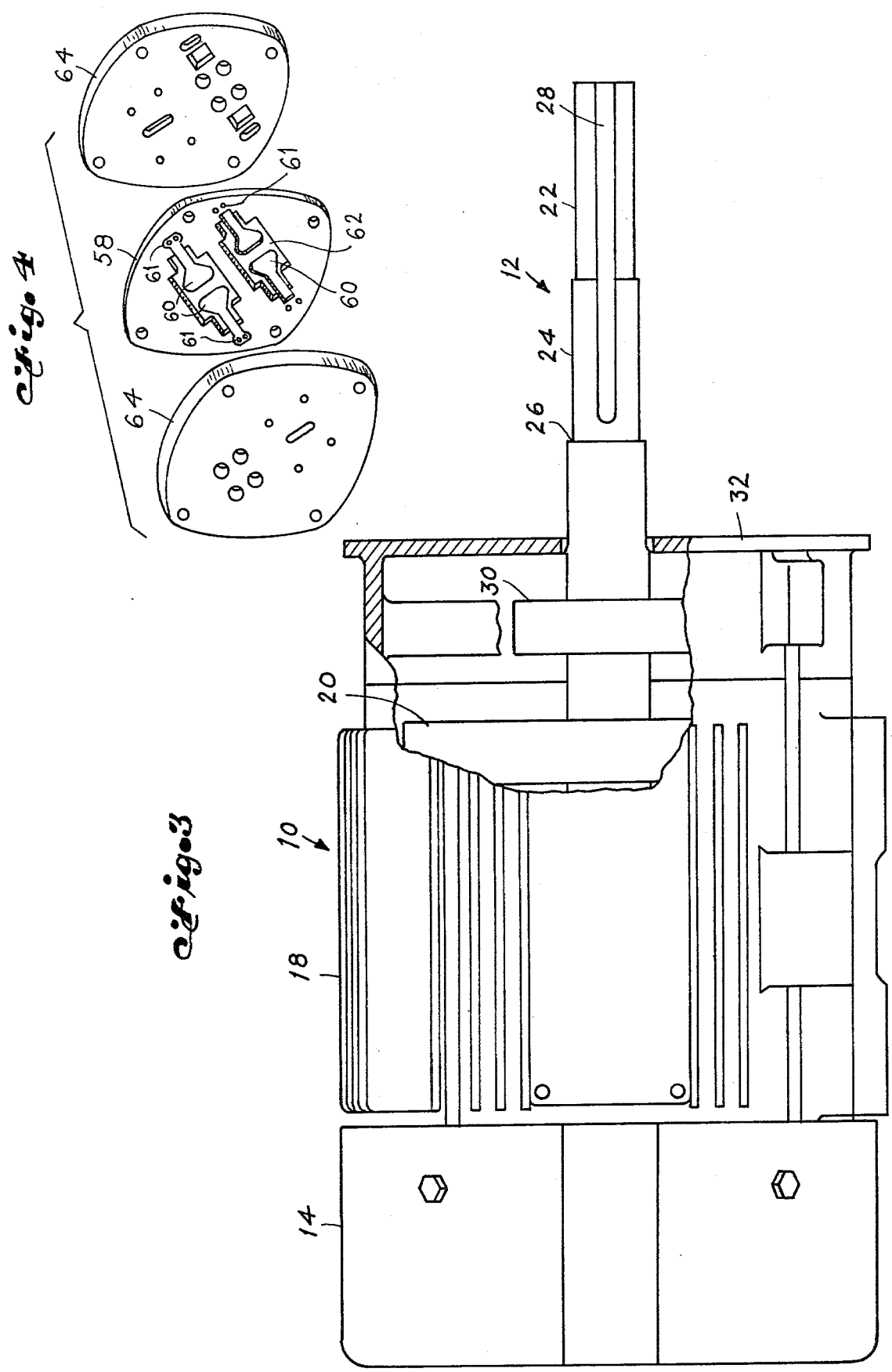

INTEGRATED HIGH CAPACITY COMPRESSOR

BACKGROUND OF THE INVENTION

1. Field of the Invention

The present invention relates to air compressors and more particularly to an integrated oil-less, reciprocating, high capacity compressor.

2. Description of the Prior Art

Heretofore, high capacity compressors were of the reciprocating type which was necessitated in order to achieve the required pressure and air handling capacity. Compressors in the two horse power and higher range had motors connected to the compressor through belt and pulley drive arrangements usually with a flywheel connected to the pulley shaft to assist in carrying peak loads. As a result of the belt and pulley connection, these devices were objectionably large and a real need existed for smaller size high capacity compressors.

A recent solution to the problem of size reduction was to use an integrated design where the drive unit and pump or compressor are connected in an integral unit on a single shaft. However, practical integral units have been limited to fractional horse power devices because of cooling difficulties and the extreme cyclic motor loading. Thus, the prior art high capacity compressors have all been objectionally large in size.

In the high capacity compressors, oil was used to assist in lubricating, sealing and cooling. Oiled surfaces in the cylinder helped to establish a seal between the piston and cylinder and between the valves and valve plates thereby allowing the development of higher pressures. Cooling was enhanced by the oil in two ways. Firstly, the oil would reduce the friction and thereby substantially reduce the friction generated heat. Secondly, the oil would also tend to carry away heat from the various hot spots in the compressor.

Recently a need has developed for high capacity oil-less compressors. In many compressor applications, oil cannot be tolerated, such as when compressors are used in medical devices, computers, instrumentation and certain processing devices.

Thus, a practical oil-less, high capacity compressor of reduced size was not heretofore available.

SUMMARY OF THE INVENTION

The present invention contemplates an oil-less, high capacity, integral reciprocating compressor which is made possible by the use of a unique motor mounted flywheel and cooling system in conjunction with a careful selection of materials to provide low friction surfaces.

A flywheel is mounted directly on the motor shaft and in the motor housing so as not to interfere with the flow of cooling air. The flywheel provides sufficient inertial torque to allow for simultaneous compression of opposed pistons. By using opposed pistons that are simultaneously compressed, the bearing load is balanced thereby simplifying the bearing and motor design.

A unique dual inlet cooling system provides for the simultaneous flow of cooling air across both the connecting rod bearings and the cylinder sleeves and heads thereby providing the essential cooling to maintain the compressor temperature at an acceptable level. A double inlet fan in conjunction with a shroud arrangement is used to draw air through the crankcase and thereafter force the crankcase air and additional air over the cylinder sleeve. The shroud is designed to increase the air velocity over the cylinder head and sleeve to provide increased heat dissipation.

In the high volume compressors reed valves are susceptible to flutter and sealing becomes a problem if the oil film is not present. These problems were overcome by the use of stainless steel reed valves mounted on a gasket clamped between two valve plates. The reed valve movement is limited to the thickness of the gasket and polished surfaces on the valve plates provide for good valve sealing.

One of the essential requirements for a successful oil-less compressor design is the use of low friction materials on all the wearing surfaces. The piston skirts and rings are filled with a self-lubricating fluorocarbon, while the cast iron cylinder sleeves have a nickel plating impregnated with a fluorocarbon. Most of the other components such as the piston, crankcase and cylinder heads are of light weight aluminum. The cylinder heads and sleeves are finned for heat dissipation.

The primary objective of the present invention is to provide an oil-less high capacity compressor.

Another objective of the present invention is to provide an oil-less reciprocating high capacity compressor.

Another objective of the present invention is to provide a high capacity integral compressor that is of smaller size than those heretofore provided.

Other objectives and advantages of the present invention will become apparent from the description which follows in conjunction with the drawings referred to therein.

BRIEF DESCRIPTION OF THE DRAWINGS

FIG. 3 is a cut away view showing the motor used in the present invention.

FIG. 4 is an exploded perspective view of the valve assembly used in the present invention.

FIG. 5 is a diagrammatic plan view illustrating the cooling air flow through the compressor of the present invention.

DESCRIPTION OF THE PREFERRED EMBODIMENT

Figure 1:
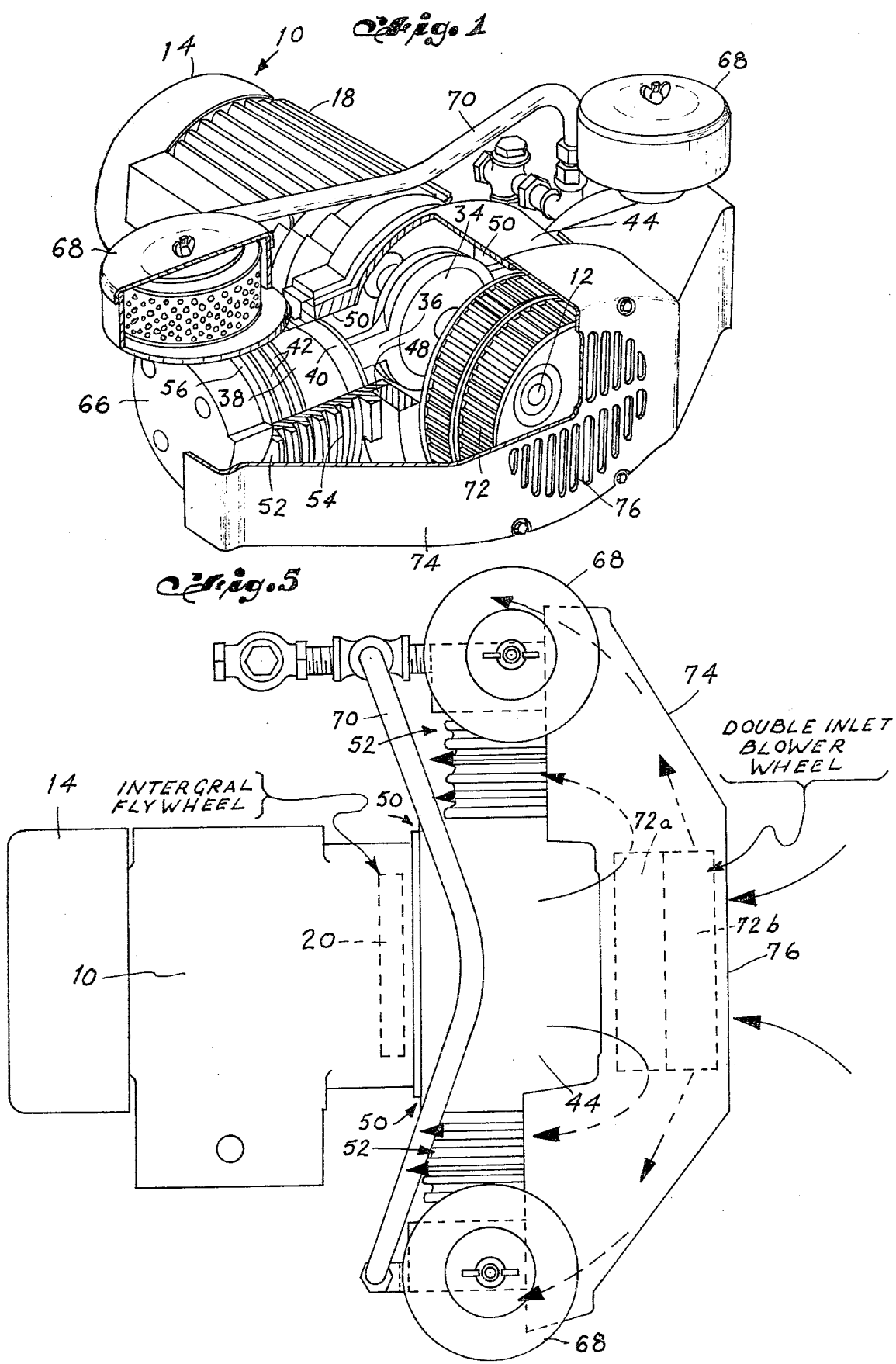
FIG. 1 is a cut away perspective view showing an integral compressor constructed in accordance with the present invention.
Figure 2:
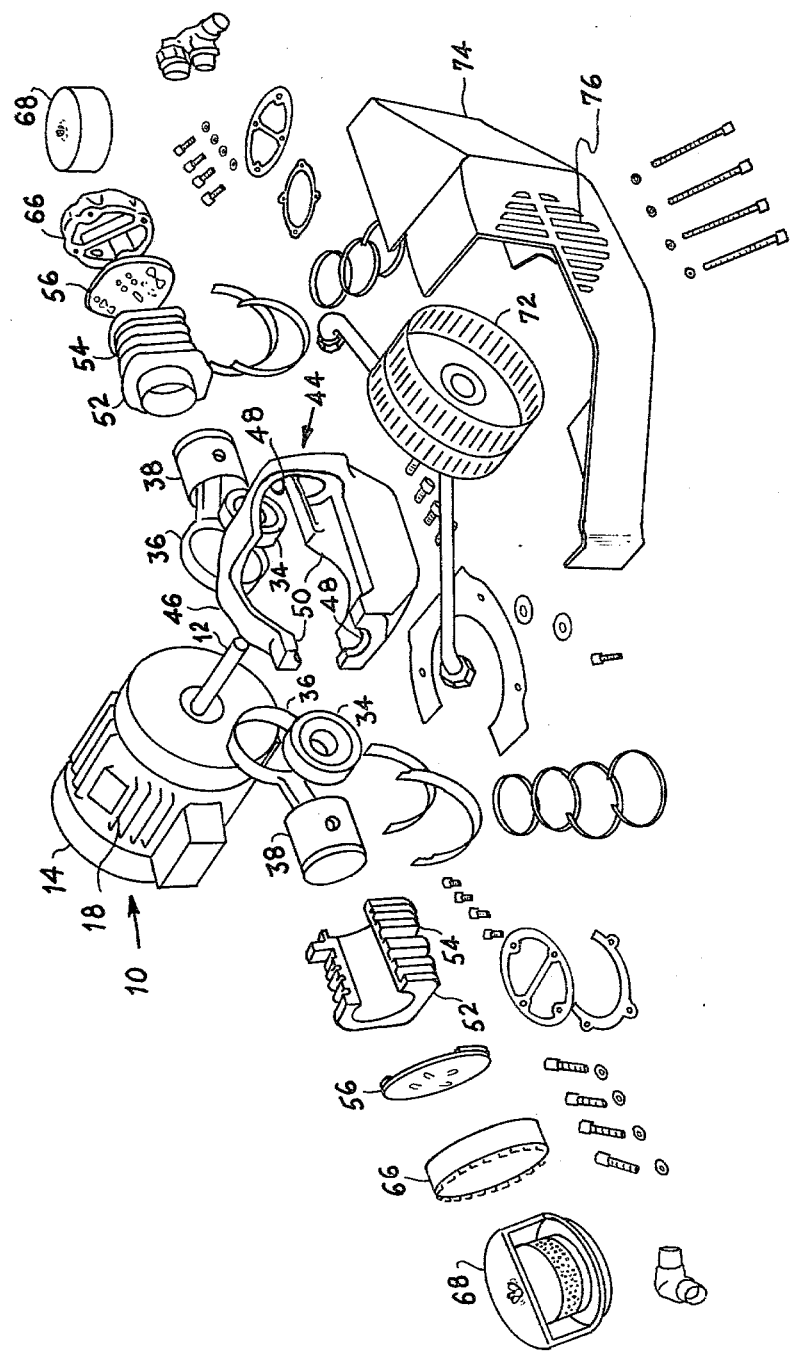
FIG. 2 is an exploded perspective view showing the components of the present invention.

Referring to FIGS. 1, 2 and 3, there is shown a motor 10 having a shaft 12 extending therefrom at one end and a fan housing 14 disposed at the opposite end thereof. The motor housing is essentially a closed unit and has cooling fins 18 formed about the surface thereof. A fan is mounted within the fan housing for circulating cooling air over the surface of motor housing and the cooling fins 18 for maintaining the interior temperature of the motor at an acceptable level. The motor was uniquely designed for the present invention with a shaft mounted flywheel 20 located within the motor housing as shown in FIG. 3. By uniquely locating the flywheel within the motor housing, the flywheel does not interfere with cooling air flow as it would if it were located in the crankcase.

Referring to FIG. 3, there is shown the shaft 12 having an outer most portion 22 that is machined to a low tolerance for mounting a blower wheel thereon. Inwardly of portion 22 there is a portion 24 that is machined to a more critical tolerance since the connecting rod eccentrics must be mounted thereon. Portion 24 terminates at a shoulder 26 which is provided for the purpose of locating the eccentrics. A key way 28 is formed along portions 22 and 24 to be used for properly locating the eccentrics and will be discussed subsequently. The shaft is mounted in the motor housing at one end by a bearing 30 and adjacent thereto is mounted the flywheel 20 which is formed of steel and has a diameter of seven inches and a thickness of 1½ inches. The end bell 32 of the motor is machined to a close tolerance to provide for proper registration with a crankcase which is to be mounted thereto. A two horse power motor designed in accordance with the invention has been manufactured by General Electric as Model No. 5K184KL6453.

A pair of eccentrics 34 are mounted to portion 24 of shaft 12. The eccentrics are slip fit over said shaft and keyed thereto to prevent rotation through the use of a key inserted in key way 28. The eccentrics are designed so that the top dead centers are opposed when keyed to the shaft so that the pistons will be simultaneously compressed. A pair of connecting rods 36 are bearing mounted to the eccentrics at one end and are attached to pistons 38 at an opposite end thereof. Pistons 38 are formed of aluminum but are provided with skirts 40 formed of a composition containing 15% by-volume carbon filler in a fluorocarbon to provide a substantially self-lubricated piston skirt for providing a low friction surface for the piston. The piston also has rings 42 that are formed of a composition of 55% bronze, 5% molydisulfide and 40% fluorocarbon which also provides a low friction surface for the rings.

Disposed about the connecting rods, the rod bearings, the eccentrics and the motor shaft, is a cast aluminum crankcase 44. Crankcase 44 is mounted to the end bell 32 of the motor and has a machined surface 46 that mates with the machined surface of end bell 32 to provide proper registration between the crankcase and the motor. Crankcase 44 has an open end opposite the machined surface 46. On opposite sides of the crankcase are provided two openings 48 for receiving and properly positioning cylinder sleeves. Crankcase 44 is also provided with ventilation windows 50 formed by breaks in surface 46 for providing an air inlet to the crankcase. A plurality of openings are also formed in a bottom surface of the crankcase.

A pair of cylinder sleeves 52 are disposed about the pistons 38 and are mounted in the openings 48 in crankcase 44. Cylinder sleeves are cast of iron with fins 54 formed about the exterior surface for providing heat dissipation. The cylinder sleeves have a cylindrical interior surface that is nickel plated with fluorocarbon impregnation for providing a smooth low friction surface for contact with the piston skirts and rings.

A pair of valve assemblies 56 are mounted to the ends of the cylinder sleeves and contain both inlet and discharge valves. Referring to FIG. 4, there is shown the detailed structure of a valve assembly 56 wherein a compressed fiber gasket 58 has mounted thereto four stainless steel reed valves 60, two of said valves being disposed on one side of the gasket as inlet valves and two on an opposite side thereof as discharge valves. The reed valves 60 are connected to the gasket at 61 and the free ends are located over openings 62 formed in the gasket said openings having the same shape as the reed valves but being of a slightly larger size so that the free ends of the valves may move in and out of the openings freely. The gasket 58 is mounted between two nickel plated valve plates 64 which have polished surfaces for providing a good surface to surface seal with the reed valves 60. The gasket 58 has a thickness of 0.080 inches and thereby limits the maximum valve travel to that distance. The stainless steel inlet valves have a thickness of 0.010 inch while the discharge valves have a thickness of 0.014 inch.

A pair of aluminum cylinder heads 66 are mounted over the valve assemblies 56 and contain both inlet and discharge ports which are in communication respectively with the inlet and discharge valves of assemblies 56. Air filters 68 containing standard paper filter elements are mounted to the cylinder heads and are in communication with the inlet ports thereof for filtering the air drawn into the compressor. A tubular manifold 70 is connected to the discharge ports in cylinder heads 66 and has an outlet for providing the compressor output.

Mounted on portion 22 of shaft 12 is a double inlet blower 72 having a diameter of 7.17 inches similar to a Brookside 60 series double inlet blower. A first inlet side 72a of the blower is disposed adjacent to the open end of the crankcase, the opening of which conforms in size to the blower inlet opening. Mounted over said blower and along one side of the cylinder sleeves and heads is a shroud 74 which may be formed of cast aluminum or sheet metal. Said shroud has a grill opening 76 formed in the front part thereof adjacent the second inlet side 72b of the double inlet blower 72.

Referring to FIG. 5, there is shown how the cooling air is drawn in through the ventilation windows 50 and through the crankcase by inlet side 72a of the blower for cooling the connecting rod bearings. The second inlet 72b of the blower draws air through opening 76. The air from both inlets 72a and 72b is discharged into shroud 74 and directed over the cylinder sleeves 52 and cylinder heads 66 to remove heat therefrom. The particular shape of the shroud 74 results in an increased air velocity over the cylinder head and sleeves to improve the heat dissipation.

The present invention has been constructed in both two and three horse power sizes that provide 14.3 and 17.0 standard cubic feet per minute capacity respectively with continuous pressure ratings of 100 pounds per square inch gauge with intermittent duty extending to 110 psig. Thus, the present invention provides an integral reciprocating compressor wherein the bearing loads are balanced by providing simultaneous compression by opposed pistons. The simultaneous compression being made possible through the unique use of a motor shaft mounted flywheel to provide the additional torque required during the simultaneous compression. By locating the flywheel in the motor housing, it does not interfere with the flow of cooling air. The integrated reciprocating compressor also has the advantage of being oil-less so that it may be used in many of the new applications wherein oil cannot be tolerated. The oil-less feature being made possible through the proper selection of low friction self-lubricated materials and a unique cooling system. A double inlet blower has a first inlet that draws air through crankcase for cooling the connecting rod bearings. The second inlet draws in additional outside air which is then directed along with the crankcase air over the cylinder sleeves and heads through the use of an uniquely designed shroud which increased the air velocity in the areas of the cylinder heads and sleeves to improve heat dissipation. Thus, the present invention fulfills a long felt need in the compressor industry for an oil-less high capacity compressor having a reduced size.

What is claimed is:

1. An integral reciprocating compressor, comprising:
   a motor having a housing and a shaft extending therefrom;
   a flywheel mounted on said motor shaft within said housing;
   at least one pair of compression chamber forming means;
   movable piston members disposed in each of said compression chambers;
   means for connecting the piston members to said motor shaft so that the piston members in a pair of compression chambers undergo a simultaneous compression stroke;
   a crankcase enclosing both the motor shaft and the means connecting the piston member to the motor shaft, said crankcase also connecting the motor housing and compression chamber forming means so that the compression chambers of a pair are positioned at opposite sides of said motor shaft;
   valving means for allowing gas to controllably flow into and out of the compression chambers in response to piston member motion;
   a vent window formed in said crankcase adjacent said motor housing;
   air circulating means connected to said motor shaft for circulating air through the vent window and the crankcase for cooling the means connecting the piston members to said motor shaft; and
   a shroud for directing the air circulated through said crankcase over the compression chamber forming means and the valving means, whereby the circulating air from the vent window first cools the connecting means and then the compression chambers and valving means, said shroud also including a vent opening through which the air circulating means circulates additional air, said additional air being directed by the shroud over the compression chamber forming means for providing additional cooling.

2. A compressor as described in claim 1 wherein the air circulating means comprises a double inlet blower having a first inlet for circulating air through the vent windows, the crankcase and over the compression chamber forming means and a second inlet for circulating air through the vent opening and over the compression chamber forming means.

3. An integral reciprocating compressor, comprising:
   a motor having a shaft extending therefrom;
   at least one pair of cylinder members forming compression chambers;
   means for connecting said motor and cylinder members so that the chambers are disposed in a predetermined position;
   moveable piston members disposed in each of said compression chambers;
   means for connecting the piston members to said motor shaft so that the piston members reciprocate in said compression chambers;
   valve means for allowing gas to controllably flow into and out of the compression chambers in response to the piston member motion;
   a crankcase for enclosing the motor shaft and the means for connecting the piston members to said motor shaft, said crankcase including a vent window formed therein;
   a blower for circulating cooling air through said vent window and through said crankcase for cooling said means for connecting the piston members to the motor shaft; and
   shroud means for directing the circulating air over said cylinder members for cooling the compression chambers.

4. A compressor as described in claim 3, additionally comprising vent means formed in said shroud means and said blower comprises a double inlet blower having a first inlet for circulating air through the crankcase and vent window and thereafter over the cylinder members, the second inlet directing air through the vent means and over the cylinder members.

5. An integral reciprocating compressor, comprising:
   a motor having a shaft extending therefrom;
   at least one pair of cylinder members forming compression chambers;
   means for connecting said motor and cylinder members so that the chambers are disposed in a predetermined position;
   moveable piston members disposed in each of said compression chambers;
   means for connecting the piston members to said motor shaft so that the piston members reciprocate in said compression chambers;
   valve means for allowing gas to controllably flow into and out of the compression chambers in response to the piston member motion; and
   means for circulating cooling air first over said means for connecting the piston members to the motor shaft and then over said cylinder members whereby the connecting means and the compression chambers are sequentially cooled by the circulating air.

6. An integral reciprocating compressor, comprising:
   a motor having a housing and a shaft, said shaft having a portion extending from said housing;
   at least one pair of compression chamber forming means;
   movable piston members disposed in each of said compression chambers;
   means for connecting the piston members to said extended portion of said motor shaft so that the piston members in a pair of compression chambers undergo a simultaneous compression stroke;
   a crankcase enclosing both the extended portion of the motor shaft and the means connecting the piston member to the motor shaft, said crankcase also connecting the motor housing and compression chamber forming means so that the compression chambers of a pair are positioned at opposite sides of said motor shaft;
   valving means for allowing gas to controllably flow into and out of the compression chambers in response to piston member motion;
   a vent window formed in said crankcase adjacent said motor housing, said vent window communicating the crankcase interior with ambient cooling air;
   air circulating means connected to said extended portion of said motor shaft for circulating cooling air through the vent window and the crankcase for cooling the means connecting the piston members to said motor shaft; and
   a shroud for directing the cooling air circulated through said crankcase over the compression chamber forming means and the valving means, whereby the circulating cooling air first cools the connecting means and then the compression chambers and valving means.

* * * * *